July 30, 1963 P. BIEBER 3,099,247
SIMULATED HEDGE FOR TURF RACE TRACK
Filed Feb. 27, 1962 2 Sheets-Sheet 1

Philip Bieber
INVENTOR.

BY
Attorneys

July 30, 1963  P. BIEBER  3,099,247
SIMULATED HEDGE FOR TURF RACE TRACK
Filed Feb. 27, 1962  2 Sheets-Sheet 2
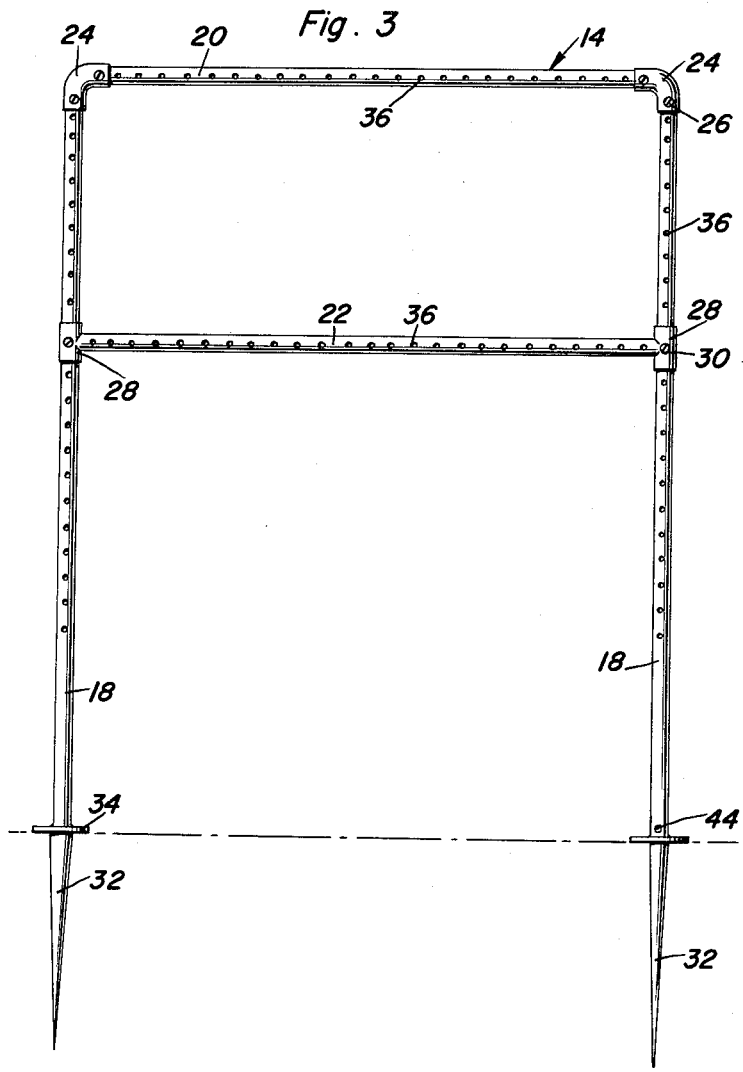
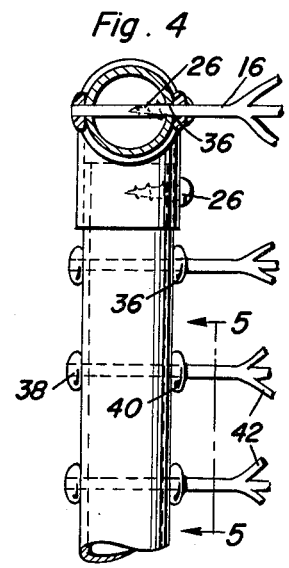
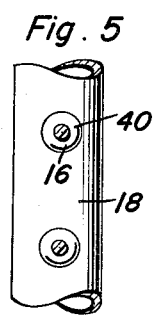
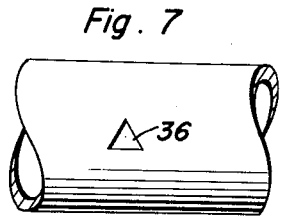
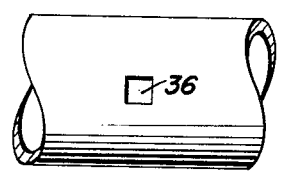
Philip Bieber
INVENTOR.

United States Patent Office 3,099,247
Patented July 30, 1963

3,099,247
SIMULATED HEDGE FOR TURF RACE TRACK
Philip Bieber, 2915 Segovia St., Coral Gables, Fla.
Filed Feb. 27, 1962, Ser. No. 175,969
4 Claims. (Cl. 119—15.5)

The present invention relates generally to a turf race track, and more specifically to a simulated adjustable hedge for use in conjunction with a turf race track.

One of the increasingly more popular forms of horse racing is a turf racing which consists of the racing of horses around and on a grass track provided with a hedge as its inner boundary or rail. However, one of the major drawbacks to turf racing is the fact that such a race can generally only be run limited times per week due to the manner in which the horses' hooves tend to tear up the sod and generally mutilate the grass, thus necessitating several days of non use to allow for the growing of new grass. This is a particularly troublesome problem directly adjacent the hedge due to the manner in which the horses tend to run as close to the inner rail as possible.

Accordingly, one of the primary objects of the present invention is the provision of a hedge which can be physically moved after each race so as to immediately present an untrampled surface for the running of a subsequent race.

A further object of the present invention is the provision of means which enable the running of a turf race while enabling the grass to grow on the track over which the previous race was run.

An additional object is the provision of a boundary hedge which can be easily moved and secured in a plurality of locations so as to allow for the running of several turf races within a relatively short period of time.

Also, an object of the present invention is to provide a hedge means which requires little or no care, contrary to the great deal of care necessary for the maintaining of a living hedge.

A further object of the present invention is the provision of a plurality of individual easily disassembled units enabling the simulated hedge to be quickly and compactly stored or shipped.

Likewise an object of the present invention is the provision of an artificial hedge which simulates the appearance of an actual hedge.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an elevational view of one of the units comprising the hedge of the present invention;

FIGURE 4 is a cross-sectional view on an enlarged scale taken substantially on a plane passing along line 4—4 in FIGURE 2;

FIGURE 5 is a sectional view taken substantially on a plane passing along line 5—5 in FIGURE 4;

FIGURE 7 illustrates a modified form of aperture used to secure the simulated hedge branches; and FIGURE 8 is an illustration of a further modification of aperture.

Figure 1:
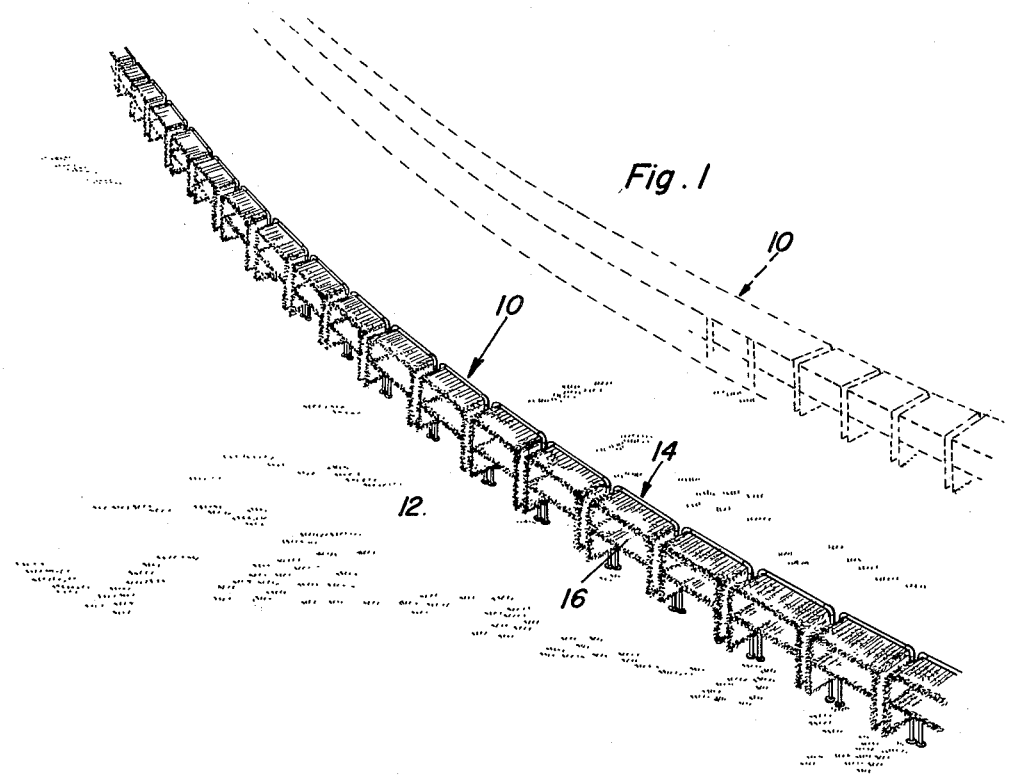
FIGURE 1 is a perspective view of a portion of a turf track with the simulated hedge shown in full lines in one position and shown in phantom lines in a second position illustrating the manner in which the hedge is to be moved so as to present a fresh grass track.

Referring now more particularly to the drawings, reference numeral 10 generally designates the simulated hedge comprising the present invention. This hedge 10 is used to outline a grass or turf track 12 and consists basically of a frame 14 and a plurality of branch simulating members 16.

The frame 14 consists of two side members 18, a top member 20 and at least one intermediate member 22. The top member 20 is removably secured to the two side members 18 by means of elbows 24 and removable screw means 26. While screw means 26 have been illustrated as being self tapping screws, it is readily apparent that setscrews can also be used. Each intermediate member 22 is provided with an extending tubular portion 28 at each end thereof being of a size so as to accommodate the side members 18 therethrough with the side members 18 being secured to the intermediate section 22 by screw means 30 projecting through the tubular end portions. Each side section 18 is additionally provided with a pointed extension 32 at its lower end thereof to enable the frame 14 to be easily inserted into the ground. Additionally, a stop means 34 is provided so as to insure the obtaining of a standard height each time the simulated hedge 10 is used. It will also be noted that the stop plate 34 further functions so as to stabilize the frames 14. In the preferred form of the invention, the sections comprising the frame 14 are made of heavy gauge aluminum either painted or anodized a deep green so as to further resemble a hedge.

The front face of each frame or unit 14 is provided with a plurality of apertures 36 which extend directly through the frame members and are positioned approximately one inch apart across the top section 20, across the intermediate section 22, and down the side sections 18 to a point approximately ten inches above the stop plate 34. As will be noted in FIGURE 4, the apertures 36 extend entirely through the various frame members thereby enabling the branch-like members 16 to be inserted through the frame members and formed with inner and outer expanded portions 38 and 40 so as to secure the simulated branches 16 in position.

Figure 2:
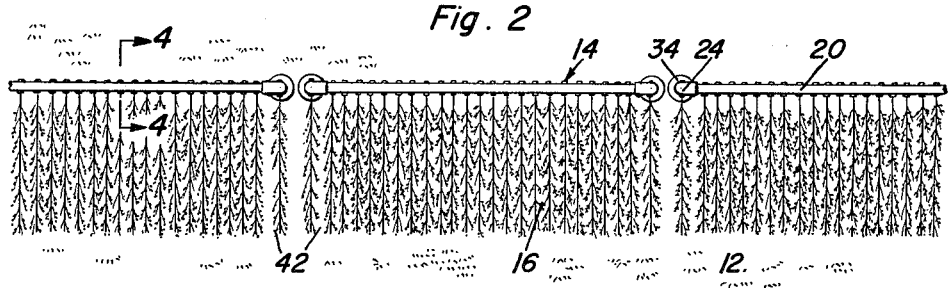
FIGURE 2 is a plan view of a partial section of the hedge of the present invention.
Figure 6:
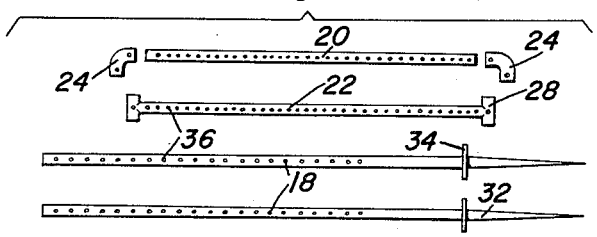
FIGURE 6 is a view illustrating the various sections comprising each hedge unit of the present invention.

The simulated branches 16 are generally formed of spring wire coated with a plastic material, preferably green, so as to give the appearance of an actual hedge. As seen in FIGURES 2 and 4, the plastic coating is additionally formed so as to provide a plurality of small twigs 42 thus further increasing the resemblance to an actual hedge.

As shown in FIGURES 7 and 8, the apertures 36 may be either triangular or rectangular in addition to being round. While it has not been specifically illustrated, attention is directed to the fact that the apertures 36 can be provided completely around the peripheries of the frame members 18, 20 and 22 so as to enable the simulated branches 16 to extend at angles other than approximately 90° to the frames 14 as illustrated. It will be noted that such an arrangement will enable the user of the simulated hedge 10 to space the frames 14 apart from each other with the intermediate space being hidden by the branches 16 extending outwardly in a manner so as to substantially hide the space between the frames 14. This is important as a matter of economy in that substantially the same results are obtained by the use of fewer frames than would normally be required if merely forward facing apertures were provided.

Because of the tubular nature of the frame 14 it is generally desirable to provide a plurality of drain holes 44 near the base plate 34 of each side member 18.

The simulated hedge of the present invention enables the running of a plurality of turf races within a relatively short time without the necessity of having to wait for the grass to reappear after each race. This is accomplished by the provision of a plurality of movable frames or units each simulating a section of a hedge by means of a plurality of extending plastic coated spring wires which are generally maintained in a horizontally extending position but which also can readily flex so as to avoid injury to a horse brushing thereagainst. These individual hedge sections, can, immediately after the running of a race, be positioned either forwardly or backwardly so as to present a fresh grass track for the running of a subsequent race. Another significant feature of the present invention is the manner in which the individual hedge frames can be readily disassembled for easy storage and quickly assembled when needed. Similarly, the use of such materials as aluminum and plastic coated spring wire result in a structure which is practically maintenance free as compared to the standard living hedges now used which must be constantly trimmed and watered as well as protected from various insect and animal life.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A portable simulated hedge for race tracks comprising a plurality of individual self-supporting units, each unit including a pair of vertically extending laterally spaced side members, a pair of horizontally extending members secured to and interconnecting said side members, said vertical and horizontal members being orientated in the same vertical plane, a plurality of elongated flexible simulated branches projecting laterally to one side of the vertical plane of the unit members, means fixing said branches to selected portions of said members, and means for temporarily vertically positioning the unit with the upper edge thereof at a consistent predetermined height.

2. The structure of claim 1 wherein said branches consist of plastic coated flexible wire, and said means fixing said branches to said members consist of, in regard to each branch, an opening passing transversely entirely through the corresponding member, said opening being of a size only sufficient so as to receive the branch therethrough, and laterally enlarged portions on the branch in abutment with the member at both ends of the opening so as to retain the branch therein.

3. The structure of claim 2 wherein the means for temporarily positioning each unit consists of a depending pointed extension on the lower end of each vertical side member, and an enlarged laterally projecting stop plate rigidly affixed to each vertical member at a predetermined height and engageable with the surface of the ground so as to act as a limit to the penetration of the vertical member into the ground, the stop plates on all of the units being located at substantially the same height so as to present a uniform over-all appearance to the portable hedge.

4. A portable rail hedge consisting of a plurality of individual units, each unit consisting of a planar frame, means for temporarily maintaining said frame vertically, and a plurality of simulated branches with enlarged portions projecting laterally from said frame, said branches being formed of plastic coated flexible wire, said frame having a plurality of transverse passages therethrough, one end of each branch being received through the passages, said laterally enlarged portions on each branch in abutment with the frame at both ends of the corresponding passage.

References Cited in the file of this patent

UNITED STATES PATENTS

| | | |
|---|---|---|
| 1,504,721 | Sauve et al. | Aug. 21, 1924 |
| 2,113,922 | Merkel | Apr. 12, 1938 |
| 2,366,377 | Zois | Jan. 2, 1945 |
| 2,467,565 | Owens et al. | Apr. 19, 1949 |
| 2,670,182 | Oberwerger | Feb. 23, 1954 |
| 2,716,828 | Adler, Jr. | Sept. 6, 1955 |
| 2,780,440 | Krieger | Feb. 5, 1957 |
| 2,960,964 | Murphy | Nov. 22, 1960 |